United States Patent
Doi et al.

(10) Patent No.: US 7,587,574 B2
(45) Date of Patent: Sep. 8, 2009

(54) ADDRESS TRANSLATION INFORMATION STORING APPARATUS AND ADDRESS TRANSLATION INFORMATION STORING METHOD

(75) Inventors: Masanori Doi, Kawasaki (JP); Iwao Yamazaki, Kawasaki (JP); Tsuyoshi Motokurumada, Kawasaki (JP); Masahiro Doteguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 427 days.

(21) Appl. No.: 10/986,136

(22) Filed: Nov. 12, 2004

(65) Prior Publication Data

US 2006/0026381 A1    Feb. 2, 2006

(30) Foreign Application Priority Data

Jul. 29, 2004    (JP)    ............................. 2004-221216

(51) Int. Cl.
G06F 12/10    (2006.01)
(52) U.S. Cl. .................. 711/206; 711/207; 711/216
(58) Field of Classification Search ........................ None
See application file for complete search history.

(56) References Cited

U.S. PATENT DOCUMENTS

| 4,215,402 | A | * | 7/1980 | Mitchell et al. ............. 711/216 |
| 4,761,733 | A | | 8/1988 | McCrocklin et al. |
| 5,359,720 | A | * | 10/1994 | Tamura et al. .............. 711/108 |
| 5,630,087 | A | | 5/1997 | Talluri et al. |
| 5,754,818 | A | * | 5/1998 | Mohamed .................... 711/207 |
| 6,233,668 | B1 | * | 5/2001 | Harvey et al. ............... 711/206 |
| 6,990,551 | B2 | * | 1/2006 | Hum et al. .................... 711/3 |
| 7,099,999 | B2 | * | 8/2006 | Luick ......................... 711/137 |

FOREIGN PATENT DOCUMENTS

| GB | 2 395 307 | 5/2004 |
| JP | 3-20847 | 1/1991 |
| JP | 5-81132 | 4/1993 |
| JP | 10-49545 | 2/1998 |

OTHER PUBLICATIONS

European Search Report issued in corresponding European Patent Application No. 04257429.3, on Aug. 14, 2007.

* cited by examiner

Primary Examiner—Gary J Portka
(74) Attorney, Agent, or Firm—Staas & Halsey LLP

(57) ABSTRACT

Context information pertaining to the virtual address is obtained, and a storage location for storing the address translation information is determined based on the context information.

10 Claims, 8 Drawing Sheets

ADDRESS TRANSLATION INFORMATION STORING APPARATUS AND ADDRESS TRANSLATION INFORMATION STORING METHOD

BACKGROUND OF THE INVENTION

1) Field of the Invention

The present invention relates to a technology for converting virtual addresses to actual addresses.

2) Description of the Related Art

These days virtual storage systems have been widely used. The virtual storage systems have a bigger storage space (a virtual storage space), which can be used virtually, than the storage space of a computer system (an actual storage space). Both the actual storage space and the virtual storage space are divided into blocks called pages.

A correlation between the virtual address of a virtual page in the virtual storage space and the actual address of an actual page in the actual storage space is stored in a list table called a page table. The page table is referred to when converting the virtual address to the actual address.

Though the page table is usually stored in a random access memory (RAM), the process of referring to the page table every time the virtual address is to be converted to the actual address slows down the translation process.

As a countermeasure, an address translation cache, called a translation look-aside buffer (TLB), which can be accessed much faster than the RAM, is installed in a CPU. The correlation between the recently converted virtual addresses and the actual addresses are maintained in the TLB. The TLB serves as an easy reference for subsequent conversions of virtual address to the actual address, thereby enhancing the translation speed of the addresses.

The TLB may be composed of two types of memories: RAM and a content addressable memory (CAM). The TLB that is composed of a RAM (hereinafter, "TLB-RAM") implements a set-associative method of an associativity of one or greater to store more TLB entries.

The TLB that is composed of the CAM (hereinafter, "TLB-CAM") circumvents the limitations on the page size that can be stored in the TLB-RAM and can efficiently search pages of various sizes.

The TLB entries stored in the TLB are assigned a page size. The page size is of four types: 8 kilo-byte page, 64 kilo-byte page, 512 kilo-byte page, and 4 mega-byte page.

Since the TLB-RAM can register only one type of page size by virtue of its structure, two RAMs are provided which can register TLB entries of 8 kilo-byte page and 4 M byte page. On the other hand, the TLB-CAM can register the TLB entries of all types of page sizes and can register a special TLB entry referred to as a locked entry.

The TLB replaces the TLB entries when information pertaining to a requested virtual address is not found in the TLB entries and there is no space to add new TLB entries. Locked entries are those entries that cannot be replaced with other TLB entries by the TLB.

Conventional technologies can be found in Japanese Patent Laid-Open Publication Nos. 3-20847, 5-81132, and 10-49545.

However, in the conventional technology, when two or more programs use the same virtual address, the TLB entries used by these programs get concentrated in one area of the TLB-RAM (for instance, area corresponding to the first 40 mega-bytes), thereby causing thrashing in which a plurality of programs scramble the area where the TLB entries are registered.

In other words, the TLB-RAM uses a part of the virtual address as an index address, which carries out the indexing of the TLB entries stored in the TLB-RAM. Consequently, when two or more programs simultaneously use the same virtual address, the hit rate of TLB is adversely drops.

Increasing the associativity of the TLB mitigates the occurrence of the thrashing phenomenon. However, increasing the associativity of the TLB makes the circuit complicated and difficult to implement.

SUMMARY OF THE INVENTION

It is an object of the present invention to solve at least the problems in the conventional technology.

An address translation information storing apparatus according to an aspect of the present invention is an apparatus that stores address conversion information pertaining to address translation between a virtual address and an actual address. The address translation information storing apparatus includes an obtaining unit that obtains context information pertaining to the virtual address; and a determining unit that determines a storage location for storing the address translation information based on the context information.

An address translation information storing method according to another aspect of the present invention is a method of storing address conversion information pertaining to address translation between a virtual address and an actual address. The address translation information storing method includes obtaining context information pertaining to the virtual address; and determining a storage location for storing the address translation information based on the context information.

The other objects, features, and advantages of the present invention are specifically set forth in or will become apparent from the following detailed description of the invention when read in conjunction with the accompanying drawings.

DETAILED DESCRIPTION

Exemplary embodiments of an address translation information storing apparatus and an address translation information storing method according to the present invention are explained next with reference to the accompanying drawings.

Figure 1:
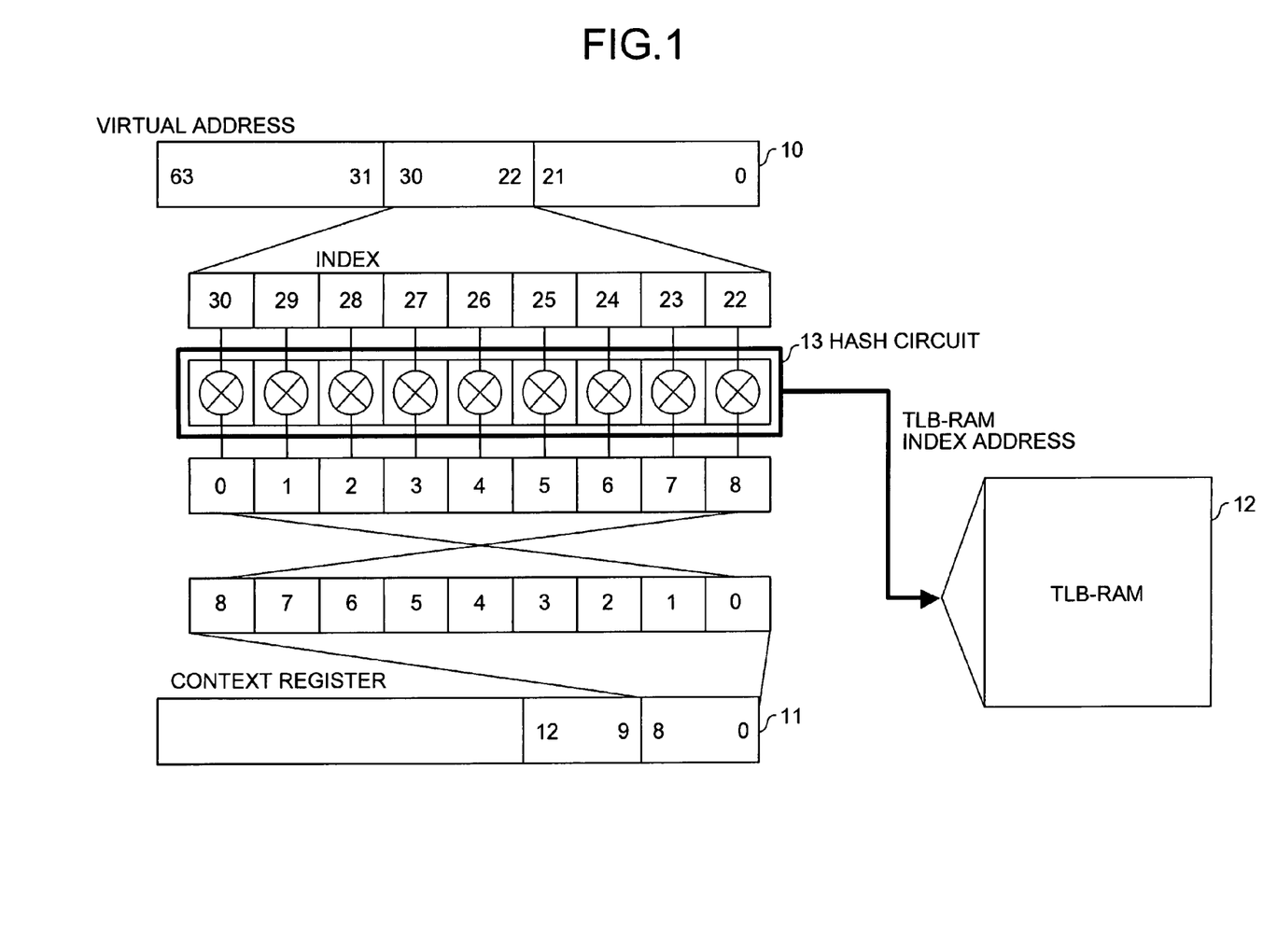
FIG. 1 is a schematic diagram of an address translation information storing process according to a first embodiment of the present invention.
Figure 2:
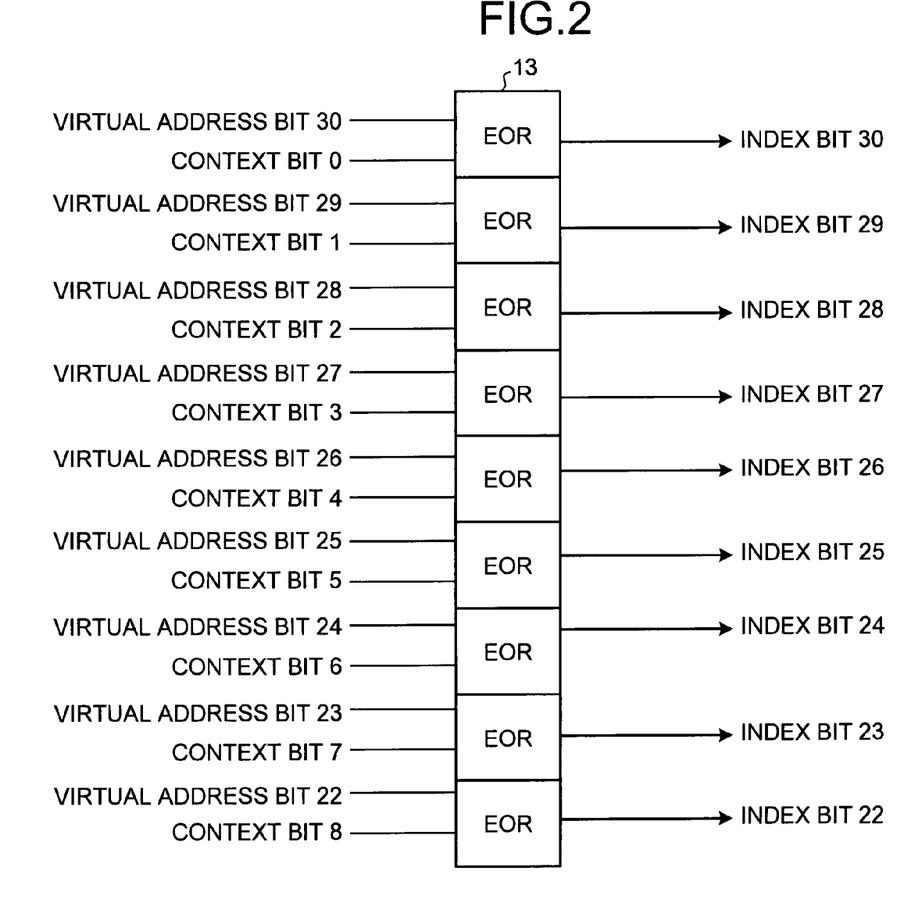
FIG. 2 is a detailed drawing of a hash circuit shown in FIG. 1.

An address translation information storing process according to a first embodiment of the present invention is explained. FIG. 1 is a schematic diagram of the address translation information storing process according to the first embodiment of the present invention. FIG. 2 is a detailed configuration of a hash circuit 13 shown in FIG. 1. An instance of registering a 4 mega-byte (M byte) page TLB entries in a 512-line, two-way TLB-RAM is taken as an example.

As shown in FIG. 1, based on a value of a context stored in a 64-bit virtual address 10 and a context register 11, a location (a TLB-RAM index address) for storing the address translation information, which is information pertaining to a correlation between a virtual address and a physical address, is determined in the TLB-RAM 12 and the address is stored in the determined location.

To be more specific, the hash circuit 13 calculates a hash value from each value of the reversed bit string from the 0th bit to the 8th bit of the context register 11 and each value from the 22nd bit to the 30th bit of the virtual address 10 (hereinafter, the portion from the 22nd bit to the 30th bit of the virtual address will be referred to as "index"). The calculated hash value is taken as the TLB-RAM index address.

In the conventional technology, each value from the 22nd bit to the 30th bit of the virtual address 10 is used as the TLB-RAM index address when a 4 M byte page TLB entries are registered in a 512-line, two-way TLB-RAM.

The context is an identifier assigned to every address space to which the program using the virtual address 10 or the virtual address 10 sought by the program belongs.

For instance, according to scalable processor architecture (SPARC, registered trademark), a context is a value that corresponds to an address space that is currently in use and is stored in the context register 11. According to mainframe architecture, a context is a value of a segment-table origin (STO) that is stored in a segment-table designation (STD).

When the program is changed, the context is saved in a memory outside of a processor and when the program is re-executed, the context is restored in the context register 11 or the STD.

As shown in FIG. 2, the hash circuit 13 shown in FIG. 1 includes a plurality of exclusive OR (EOR) elements. Each EOR element calculates, as the hash value, the EOR between the bit value of the virtual address 10 and the bit value of the reversed bit string of the context register 11.

In other words, the EOR element calculates the EOR between the value of the 22nd bit of the virtual address 10 and the value of the 8th bit of the reversed bit string of the context register 11. The calculated value is set in the bottom-most bit (index bit 22) of the bit string that constitutes the TLB-RAM index address.

Similarly, the EOR element calculates the EOR between the value of the 23rd bit of the virtual address 10 and the value of the 7th bit of the context register 11, the 24th bit of the virtual address 10 and the 6th bit of the context register 11, and so on up to the 30th bit of the virtual address 10 and the 0th bit of the context register 11. The calculated values are set from the index bit 23 respectively in the index bit 30 of the TLB-RAM index address.

Thus, by determining the TLB-RAM index address using the context value that changes from program to program, thrashing can be effectively prevented.

Since the information pertaining to the context is stored in a sequence in the lower bit of the context register 11, by reversing the bit string of the context register 11, the lower bits that have a frequently changing bit value become upper bits and the upper bits of the calculated hash value change significantly. Thus, the value of the TLB index address can be distributed efficiently.

Figure 3:
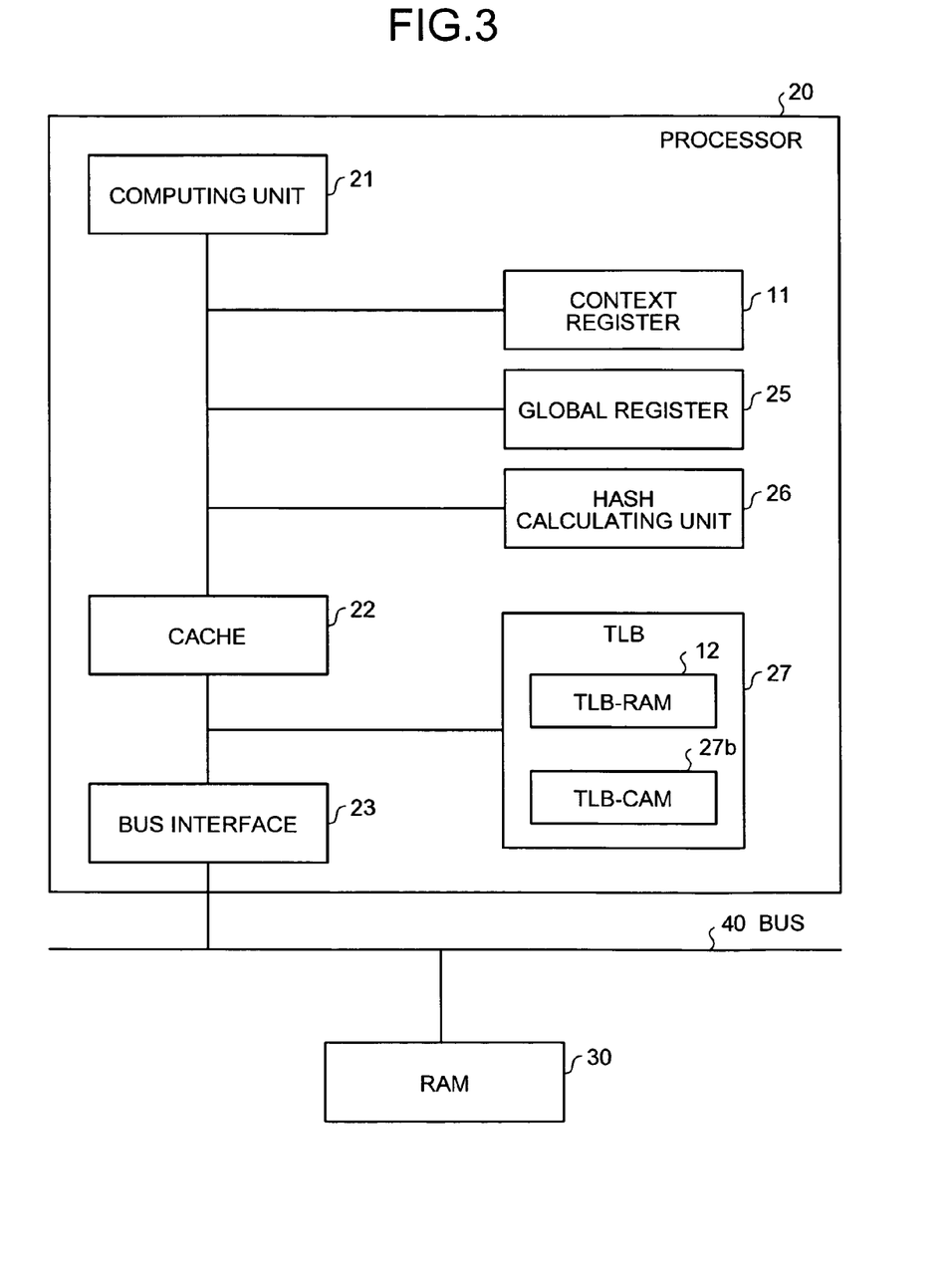
FIG. 3 is a functional block diagram of a processor according to the first embodiment.

A functional configuration of a processor according to the first embodiment of the present invention is explained next. FIG. 3 is a block diagram of a processor 20 according to the first embodiment. The processor 20 is connected to a RAM 30, and reads data from/writes data to the RAM 30 via a bus 40.

The processor 20 includes a computing unit 21, a cache 22, a bus interface 23, the context register 11, a global register 25, a hash calculating unit 26, and a TLB 27. The TLB 27 includes the TLB-RAM 12 shown in FIG. 1 and a TLB-CAM 27b.

The computing unit 21 reads the data from the RAM 30 and the cache 22 and executes the various instructions in the program. The access speed of the cache 22 is much higher than that of the RAM 30. The cache 22 temporarily saves the data read from the RAM 30 so that the computing unit 21 can access the data at a high speed.

The bus interface 23 is an interface through which data exchange between the RAM 30 and the processor 20 takes place via the bus 40. The context register 11 stores the context that is replaced every time a program is executed. The global register stores the virtual addresses, and the like.

The hash calculating unit 26 reverses the bit string of the context stored in the context register 11 and calculates as the hash value, the EOR between the bit value of the reversed bit string and the bit value of the virtual address.

The hash calculating unit 26 recreates the virtual address information from the information pertaining to the TLB entries, which are registered in the TLB-RAM 12. For instance, when the virtual address is stored in the TLB-RAM 12, the index part of the stored virtual address can be referred to only when the contents of the TLB entries are read.

To reduce the storage area that is required to store the virtual address information in the TLB-RAM 12, the bit value of the index part of the virtual address is not stored in the TLB-RAM 12. In other words, the hash calculating unit 26 calculates the bit value of the index part arithmetically.

Figure 4:
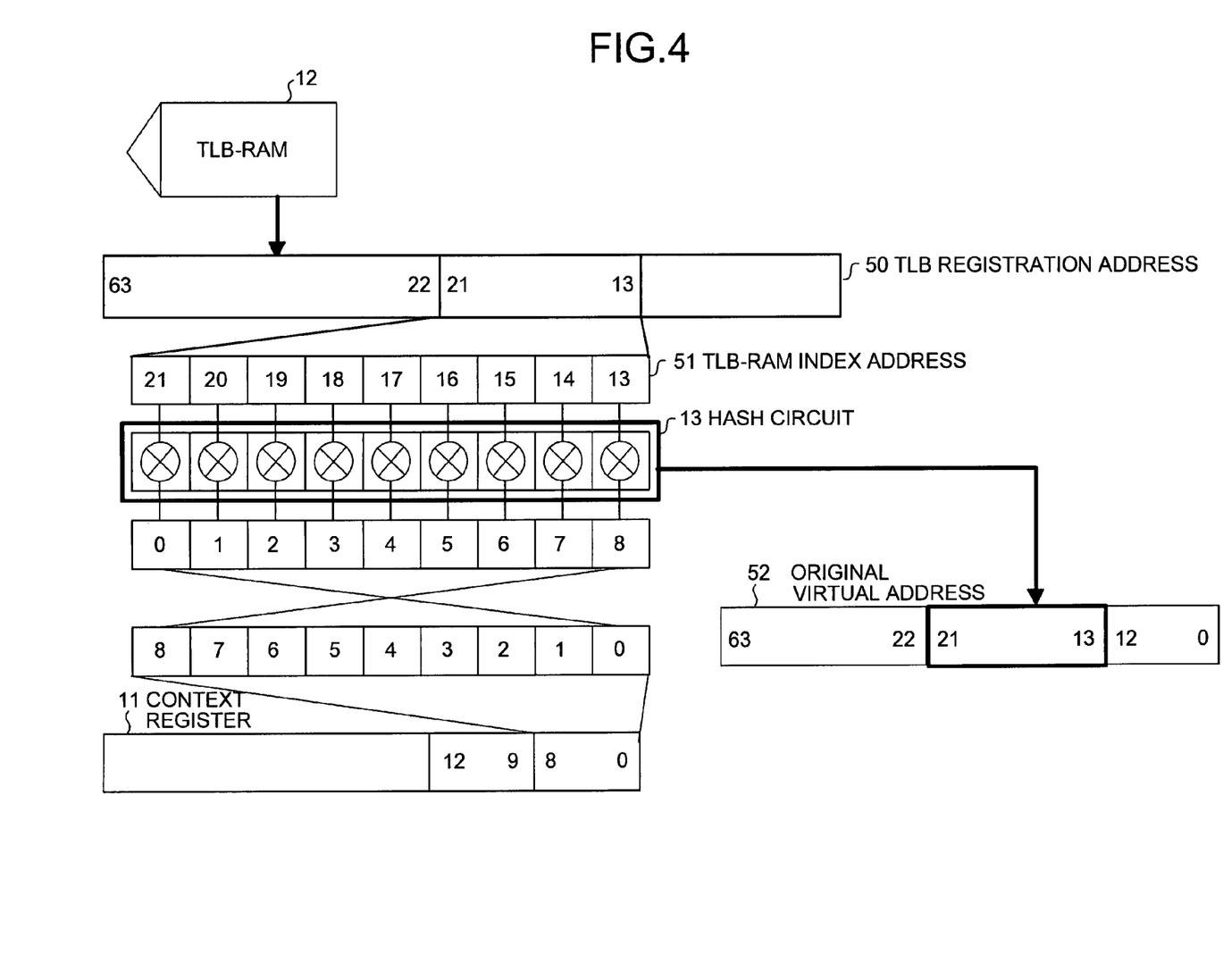
FIG. 4 is a process by which a bit value of an index part of a virtual address is calculated.

FIG. 4 is for explaining a process by which the bit value of the index part of the virtual address is calculated. When the page size of the TLB entry is 8 kilo-byte, the bit string from the 13th bit to the 21st bit of the virtual address serves as the index part, which is referred to when creating the TLB-RAM index address.

The hash calculating unit 26 obtains from the TLB-RAM 12 information pertaining to a TLB registration address 50. The TLB registration address 50 is the virtual address information registered in the TLB-RAM 12. Further, the TLB registration address 50 is a bit string from the 13th bit to the 21st bit, which is the index part of the original virtual address and which is replaced by a TLB-RAM index address 51 calculated as a result of the hash calculation.

The hash calculating unit 26 obtains from the context register 11 the bit string from the 0th bit to the 8th bit, reverses the obtained bit string, and using the hash circuit 13, calculates the EOR between the reversed bit string and the TLB-RAM index address 51.

Since the calculated EOR matches with the index part of the original virtual address, the original virtual address 52 can be re-configured by replacing the bit string from the 13th bit to the 21st bit of the TLB registration address 50 with the bit string of the calculated EOR.

Thus, even if the index part of the original virtual address is not stored in the TLB-RAM 12, the original virtual address can be re-configured from the TLB-RAM index address 51 and the information pertaining to the context. Moreover, in the SPARC (registered trademark) architecture, a process equivalent to the read command, with the help of which the TLB entries can be read from the TLB-RAM 12, can be realized.

The TLB 27 converts the virtual address to the physical address. To be more specific, the TLB 27 stores in the TLB entries the address translation information that correlates the virtual address and the physical address corresponding to it.

The TLB-RAM 12 stores the address translation information in the TLB entries specified by the TLB-RAM index address. The TLB-CAM 27b is an associative memory that can retrieve data by juxtaposing and comparing the contents of the stored data and the contents of the entered data.

When the TLB entries are locked entries or when the page sizes of the TLB entries are such that they cannot be stored in the TLB-RAM 12, the TLB 27 stores them in the TLB-CAM 27b.

Moreover, when the TLB entries are global entries, the TLB 27 stores them in the TLB-CAM 27b. The global entries are the entries shared in the address space used by a plurality of processes.

For instance, in SPARC (registered trademark) architecture, the global bit included in the TLB entries is a validly set up entry and in the mainframe architecture, it corresponds to a common segment.

When the TLB entries stored in the TLB-RAM 12 are global entries, it becomes difficult to carry out a retrieving process by which the stored TLB entries are retrieved from the TLB-RAM 12, or a de-mapping process by which the TLB entries are deleted from the TLB-RAM 12.

To be more specific, when a certain TLB entry is to be retrieved from amongst the TLB entries registered in the TLB-RAM 12, the TLB 27 can simultaneously identify from the virtual address information and the context information, the location where the TLB entry is registered.

However, if the TLB entries are global entries, since the TLB 27 does not refer to the context information, it will not be able to specify simultaneously the registered location of the TLB entries. Consequently, retrieving a certain TLB entry from amongst the TLB entries registered in the TLB-RAM necessitates checking all the TLB entries one by one, thereby adversely affecting the performance of the TLB.

Therefore, when the TLB entries are global entries, the TLB 27 stores the TLB entries in the TLB-CAM 27b and simultaneously executes the retrieving process and the deletion process of the TLB entries.

Figure 5:
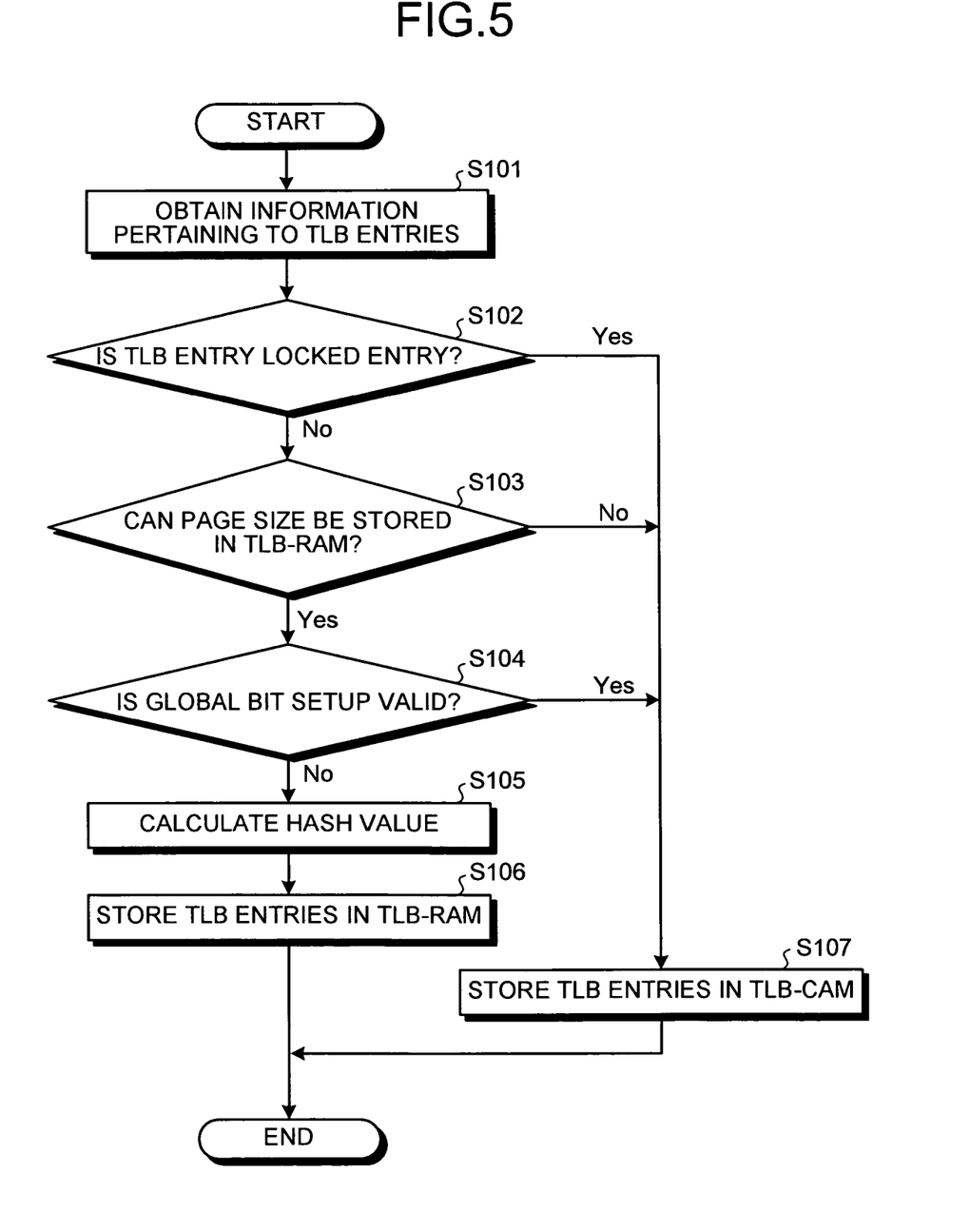
FIG. 5 is a flowchart of a process for storing TLB entries according to the first embodiment.

The procedure of storing the TLB entries according to the first embodiment is explained next. FIG. 5 is a flowchart of a process for storing the TLB entries according to the first embodiment. The TLB 27 obtains information pertaining to the TLB entries stored in the TLB-RAM 12 (Step S101).

The TLB 27 determines whether the TLB entries are locked entries by checking whether the locked bit included in the TLB entries is set up validly (Step S102).

If the TLB entries are locked entries ("Yes" in Step S102), the TLB 27 stores the TLB entries in the TLB-CAM 27b (Step S107) and terminates the storing process of the TLB entries.

However, if the TLB entries are not locked entries ("No" in Step S102), the TLB 27 checks whether the page size of the TLB entries is such that it can be stored in the TLB-RAM 12 (Step S103).

If the TLB entry page size cannot be stored in the TLB-RAM 12 ("No" in Step S103), the TLB 27 proceeds to step S107 and stores the TLB entries in the TLB-CAM 27b.

However, if the TLB entry page can be stored in the TLB-RAM 12 ("Yes" in Step S103), the TLB 27 determines whether the TLB entries are global entries by checking whether the global bit included in the TLB entries is set up validly (Step S104).

If the global bit is valid ("Yes" in Step S104), the TLB 27 proceeds to step S107 and stores the TLB entries in the TLB-CAM 27b.

However, if the global bit is not valid ("No" in Step S104), as shown in FIG. 1 and FIG. 2, the hash calculating unit 26 calculates the hash value based on the virtual address information and the context information in which the bit string is reversed (Step S105).

The TLB 27 uses the calculated hash value as the TLB index address, stores the TLB entries in the storage location of the TLB-RAM 12 that is indicated by the TLB index address, and terminates the storing process of the TLB entries (Step S106).

To sum up, according to the first embodiment, the hash calculating unit 26 obtains the context information according to the virtual address, based on the obtained context information, and determines the TLB index address that indicates the storage location of the address translation information, which is information pertaining to a correlation between the virtual address and the actual address. Because the TLB index address is determined using the context information that changes from program to program, thrashing can be effectively prevented.

Moreover, the hash calculating unit 26 calculates the hash value based on the obtained context information and determines the TLB index address based on the calculated hash value. Because the hash value is used for determining the TLB index address, thrashing can be effectively prevented.

Furthermore, the hash calculating unit 26 calculates the hash value based on the context information and the virtual address information. Because the virtual address information is used for calculating the hash value, thrashing can be effectively prevented.

Moreover, the hash calculating unit 26 calculates the hash value from the EOR between the reversed bit string of the context information and the bit string of the virtual address. Consequently, by reversing the bit string, the lower bits that have a frequently changing bit value become upper bits and the upper bits of the calculated hash value change significantly. Thus, the value of the TLB index address can be distributed efficiently.

Furthermore, the TLB 27 determines whether the address translation information is shared by a plurality of processes. If the address translation information is shared by a plurality of processes, the storing process of the address translation information in the random access memory based on the context information is not carried out. Consequently, by not storing in the random access memory the address translation information that is shared by a plurality of processes, the problems arising from determining the storage location based on the context information can be prevented.

Moreover, if the TLB 27 does not execute the storing process involving storing in the TLB-RAM based on the context information, the TLB 27 stores the address translation information in the TLB-CAM 27b. Thus, the address translation information shared by multiple processes can be handled easily and accessed at high speed.

Furthermore, since the hash calculating unit 26 creates the bit string of the virtual address based on information pertaining to the determined TLB index address and the context information, even if all the bit strings of the original virtual address are not stored, they can be restored easily.

Moreover, each bit value from the 22nd bit to the 30th bit of the 64-bit virtual address is fetched as the index and the TLB-RAM index address is calculated from the bit values of the fetched index and the context register. However, the TLB-RAM index address may also be calculated using the bit values of other parts of the virtual address. In a second embodiment of the present invention, the TLB-RAM index address is calculated by using other parts of the virtual address.

Figure 6:
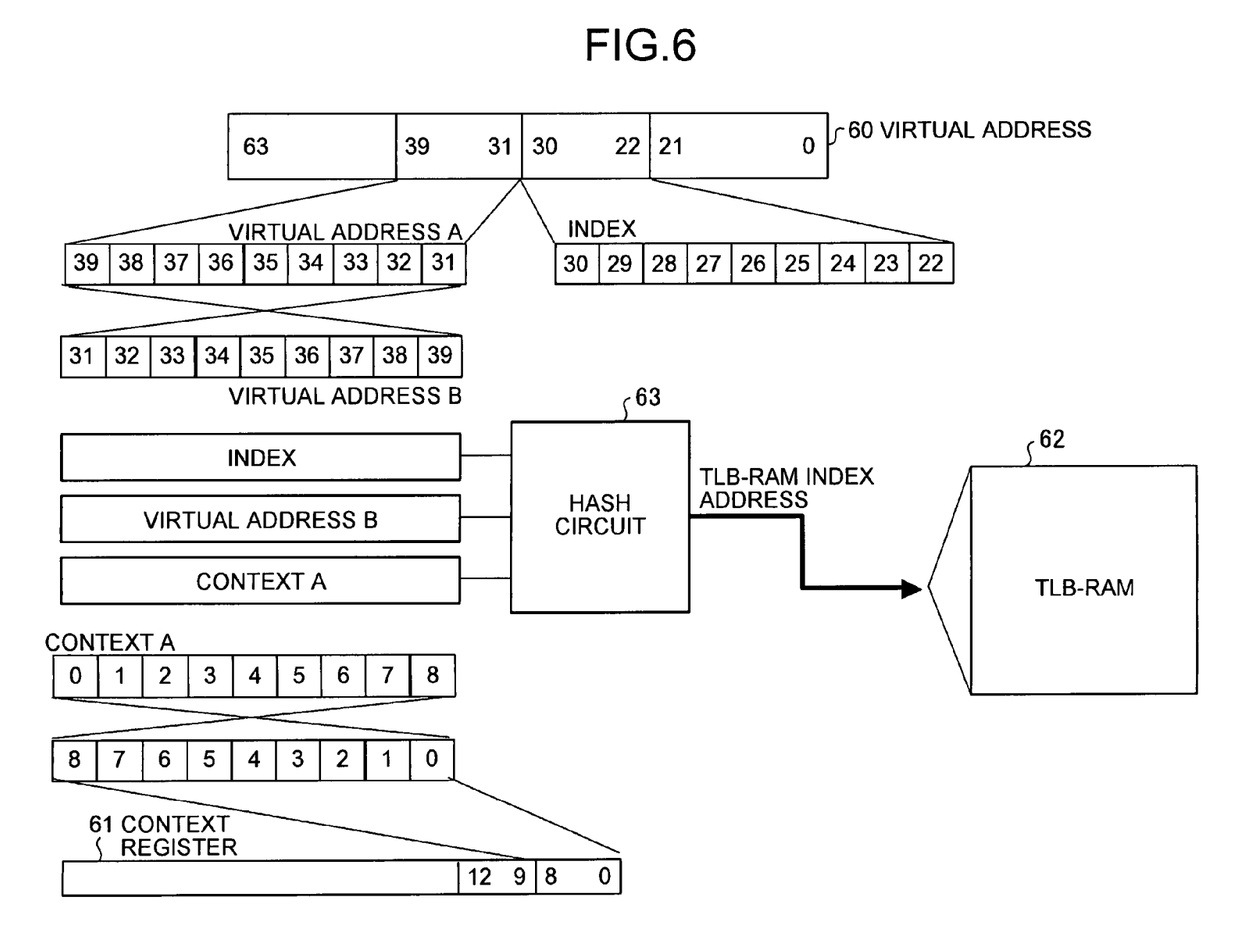
FIG. 6 is a schematic diagram of the address translation information storing process according to a second embodiment of the present invention.

FIG. 6 is a schematic diagram of the address translation information storing process according to a second embodiment of the present invention. In the address translation information storing process, two bit strings are extracted from a virtual address 60 when calculating the TLB-RAM index address.

Based on the value of the two extracted bit strings and the value of the context stored in a context register 61 (which corresponds to the context register 11 shown in FIGS. 1 and 3), the TLB-RAM index address is calculated and the address translation information is stored in the storage location indicated by the TLB-RAM index address. The TLB-RAM index address indicates the storage location of the address translation information, which is information pertaining to a correlation between the virtual address and the physical address between the virtual address and the physical address, in a TLB-RAM 62 (which corresponds to the TLB-RAM 12 shown in FIGS. 1 and 3).

To be more specific, in the second embodiment, the hash calculating unit 26 shown in FIG. 3 obtains the value of the bit string from the 22nd bit to the 30th bit of a virtual address 60 as the index and the value of the bit string from the 31st bit to the 39th bit of the virtual address 60 as a virtual address A. Moreover, the hash calculating unit 26 obtains the value of the bit string from the 0th bit to the 8th bit of the context register 61.

The hash calculating unit 26 reverses the bit string of the virtual address A obtained from the virtual address 60 to get a virtual address B. Further, the hash calculating unit 26 reverses the bit string obtained from the context register 61 to get a context A.

When a number is assigned sequentially, starting from the lower bits, to the three bit strings, namely, the index, the virtual address B, and the context A, the hash calculating unit 26 calculates, with the aid of a hash circuit 63 (which corresponds to the hash circuit 13 shown in FIG. 1), the EOR of sets of three bit values that have the same number assigned to them, and creates the bit strings of the hash values.

The hash circuit 63 is an EOR circuit that outputs the EOR of the three entered bit values. Since the index, the virtual address B, and the context A are 9-bit bit strings, the hash circuit 63 outputs a 9-bit EOR bit string.

The TLB 27 shown in FIG. 3 uses as the TLB-RAM index address, the bit string output by the hash calculating unit 26, and stores the address translation information, which is information pertaining to a correlation between the virtual address and the physical address, in the storage location of the TLB-RAM 62 indicated by the TLB-RAM index address.

To sum up, according to the second embodiment, the hash calculating unit 26 calculates the hash value based on a plurality of the bit strings (the index and the virtual address A) included in the virtual address 60 and the reversed bit string (the context A) of the context information. Because the bit strings (the index and the virtual address A) included in the virtual address 60 are used for calculating the hash value, the value of the TLB-RAM index address can be distributed efficiently.

Moreover, the hash calculating unit 26 calculates the hash value from the EOR between the bit string (the index) included in the virtual address 60, the reversed bit string (the virtual address B) included in the virtual address 60, and the reversed bit string (the context A) of the context information. Because a part of the bit string included in the virtual address 60 is inverted and used for calculating the hash value, the value of the TLB-RAM index address can be distributed efficiently.

In the above second embodiment, two bit strings are extracted from the 64-bit virtual address and the TLB-RAM index address is calculated using the two extracted bit strings and the bit string obtained from the context register. However, the TLB-RAM index address can be calculated by extracting three or more bit strings from the virtual address. This case will be explained below as a third embodiment of the present invention.

Figure 7:
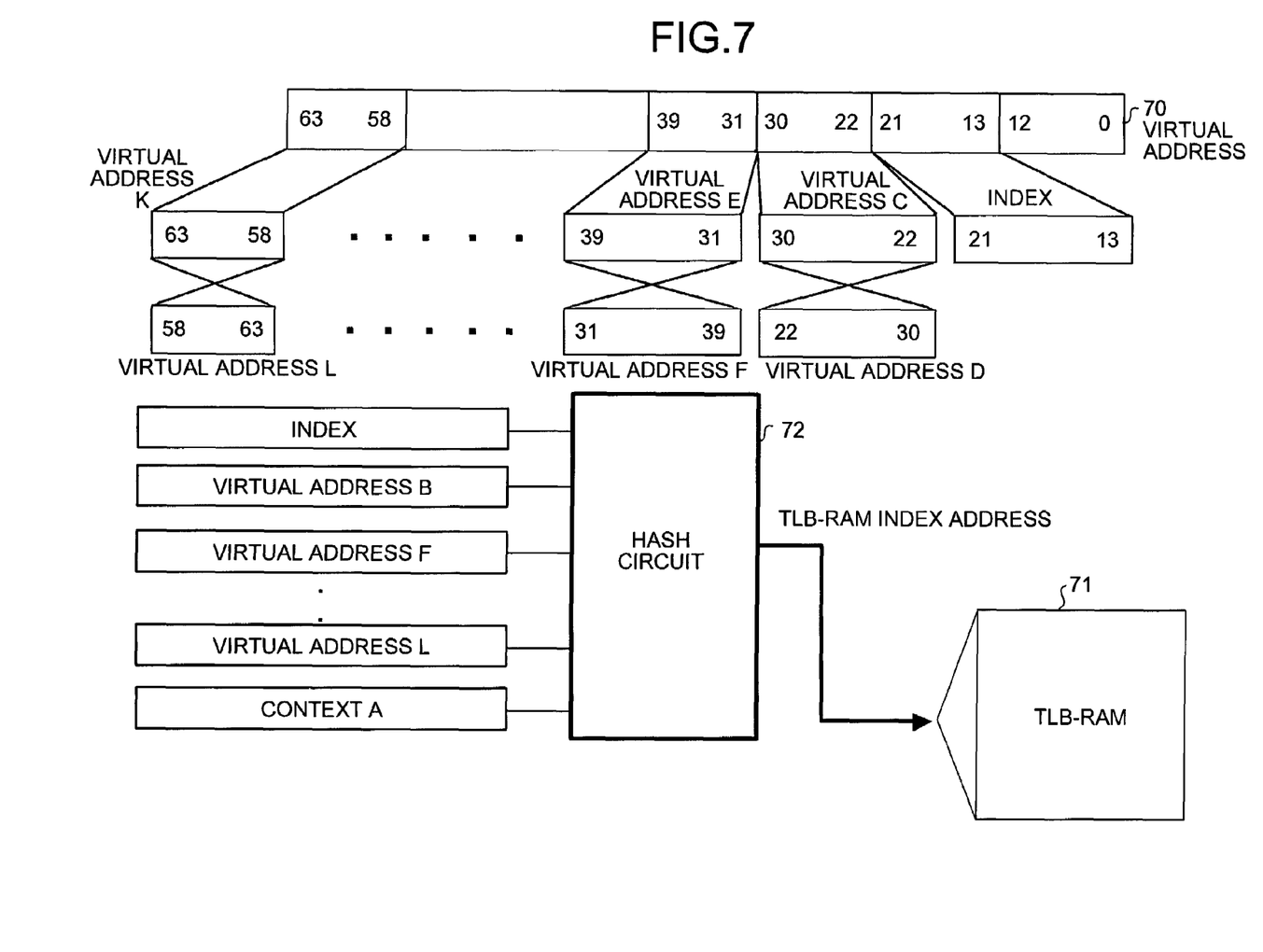
FIG. 7 is a schematic diagram of the address translation information storing process according to a third embodiment of the present invention.

FIG. 7 is a schematic diagram of the address translation information storing process according to the third embodiment of the present invention. In the address translation information storing process, six bit strings are extracted from a virtual address 70 when calculating the TLB-RAM index address.

Based on the value of the six extracted bit strings and the value of the context stored in the context register (not shown), the TLB-RAM index address, which indicates the storage location of the address translation information, which is information pertaining to a correlation between the virtual address and the physical address, in the TLB-RAM 71 (which corresponds to the TLB-RAM 12 shown in FIGS. 1 and 3) is calculated and the address translation information is stored in the storage location indicated by the TLB-RAM index address.

To be more specific, the hash calculating unit 26 shown in FIG. 3 obtains from a virtual address 70 the value of the bit string from the 13th bit to the 21st bit of the virtual address 70 as the index, the value of the bit string from the 22nd bit to the 30th bit as a virtual address C, the value of the bit string from the 31st bit to the 39th bit as a virtual address E, the value of the bit string from the 40th bit to the 48th bit as a virtual address G, the value of the bit string from the 49th bit to the 57th bit as a virtual address I, and the value of the bit string from the 58th bit to the 63rd bit as a virtual address K.

The hash calculating unit 26 reverses the bit string of the virtual addresses C, E, G, I, and K obtained from the virtual address 70 to get virtual addresses D, F, H, J, and L.

The hash calculating unit 26 obtains the value of the bit string from the 0th bit to the 8th bit of the context register and reverses the bit string obtained from the context register to get the context A.

When a number is assigned sequentially, starting from the lower bits, to the seven bit strings, namely, the index, the virtual address D, the virtual address F, the virtual address H, the virtual address J, the virtual address L, and the context A, the hash calculating unit 26 calculates, with the aid of a hash circuit 72 (which corresponds to the hash circuit 13 shown in FIG. 1), the EOR of sets of seven bit values that have the same number assigned to them, and creates the bit strings of the hash values.

The hash circuit 72 is an EOR circuit that outputs the EOR of the seven entered bit values. Since the index, the virtual address D, the virtual address F, the virtual address H, the virtual address J, the virtual address L, and the context A are 9-bit bit strings, the hash circuit 72 outputs a 9-bit EOR bit string.

The TLB 27 shown in FIG. 3 uses as the TLB-RAM index address, the bit string output by the hash calculating unit 26, and stores the address translation information, which is information pertaining to a correlation between the virtual address and the physical address, in the storage location of the TLB-RAM 71 indicated by the TLB-RAM index address.

To sum up, in the third embodiment, the hash calculating unit 26 calculates the hash value based on a plurality of the bit strings (the index, the virtual address C, the virtual address E, the virtual address G, the virtual address I, and the virtual address K) included in the virtual address 70 and the reversed bit string (the context A) of the context information. Because the bit strings (the index, the virtual address C, the virtual address E, the virtual address G, the virtual address I, and the virtual address K) included in the virtual address 60 are used for calculating the hash value, the value of the TLB-RAM index address can be distributed efficiently.

Moreover, the hash calculating unit 26 calculates the hash value from the EOR between the bit string (the index) included in the virtual address 70, the reversed bit strings (the virtual address D, the virtual address F, the virtual address H, the virtual address J, and the virtual address L) included in the virtual address 70, and the reversed bit string (the context A) of the context information. Because a part of the bit string included in the virtual address 70 is reverted and used for calculating the hash value, the value of the TLB-RAM index address can be distributed efficiently.

In the first, second, and the third embodiments, though the TLB-RAM index address is calculated using the bit string of a part of the context register and the bit string of the virtual address, it may also be calculated by extracting a plurality of bit strings from the context register. This case is explained below as a fourth embodiment of the present invention.

Figure 8:
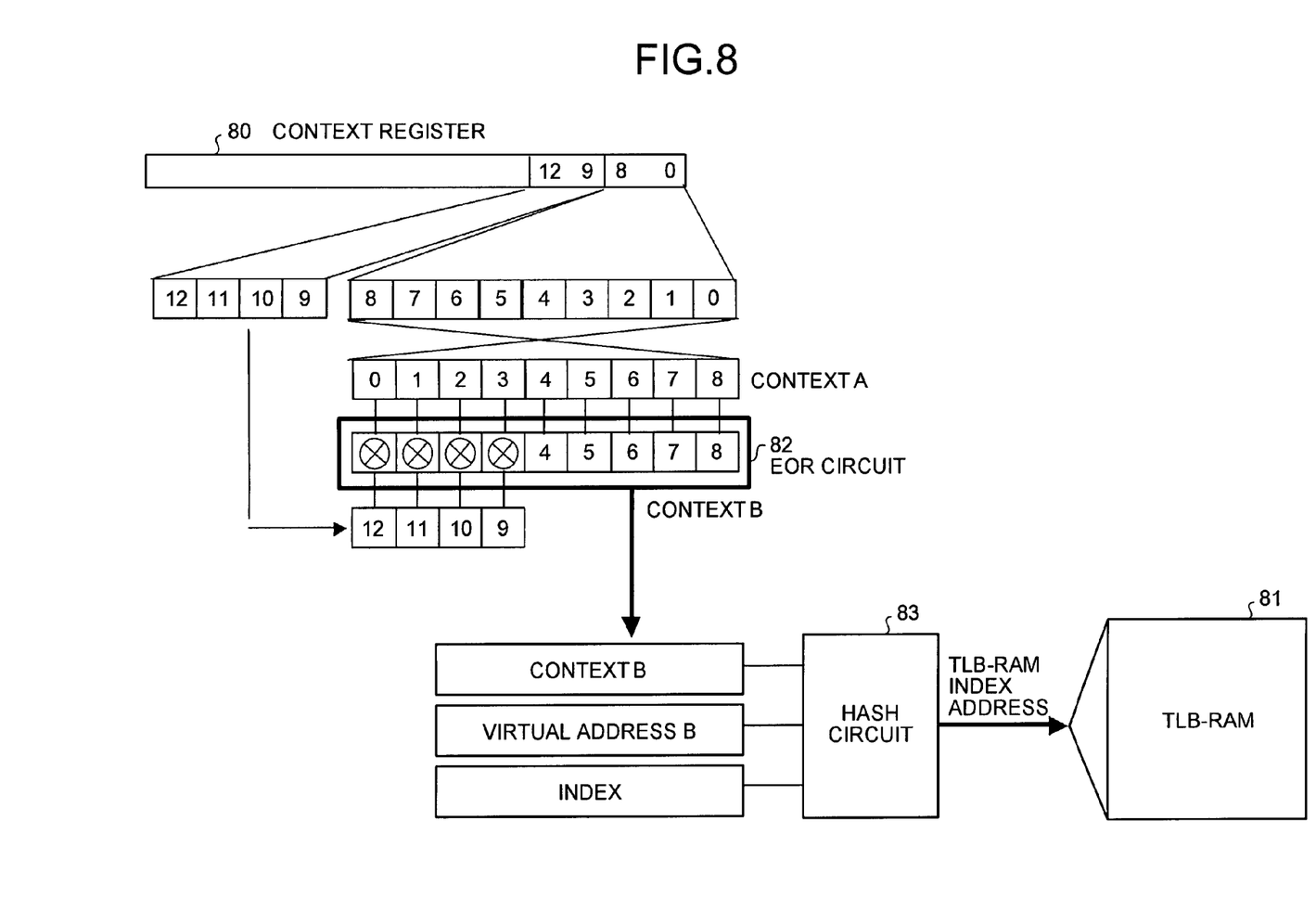
FIG. 8 is a schematic diagram of an address translation information storing process according to a fourth embodiment of the present invention.

FIG. 8 is a schematic diagram of the address translation information storing process according to the fourth embodiment of the present invention. In the address translation information storing process, two bit strings are extracted from a context register 80 when calculating the TLB-RAM index address.

Based on the value of the two extracted bit strings and the value of the bit string of the virtual address, the TLB-RAM index address, which indicates the storage location of the address translation information between the virtual address and the physical address, is calculated and the address translation information is stored in the storage location indicated by the TLB-RAM index address.

To be more specific, in the fourth embodiment, the hash calculating unit 26 shown in FIG. 3 obtains the value of the bit string from the 0th bit to the 8th bit of the context register 80 and reverses the bit string to get the context A.

The hash calculating unit 26 obtains the value of the bit string from the 9th bit to the 12th bit of the context register 80 (which corresponds to the context register 11 shown in FIGS. 1 and 3) and calculates the EOR between value of the obtained bit string and the four upper bits of the context A.

To be more specific, when a number is assigned sequentially, starting from the lower bits, to the bit string from the 9th bit to the 12th bit of the context register 80 and to the upper four bits of the context, the hash calculating unit 26 calculates, with the aid of an EOR circuit 82, the EOR of sets of four bit values that have the same number assigned to them, and creates 4-bit bit strings. Moreover, the hash calculating unit 26 creates a context B by combining the 4-bit bit strings and the lower four bits of the context A.

As shown in FIG. 6, the hash calculating unit 26 obtains the value of the bit string from the 22nd bit to the 30th bit of the virtual address and assumes the obtained bit string as the index. Moreover, the hash calculating unit 26 obtains the value of the bit string from the 31st bit to the 39th bit of the virtual address, reverses the bit string, and takes the obtained bit string as the virtual address B.

Similarly, as shown in FIG. 6, when a number is assigned sequentially, starting from the lower bits, to the three bit strings, namely, the context B, the virtual address B, and the index, the hash calculating unit 26 calculates, with the aid of a hash circuit 83 (which corresponds to the hash circuit 13 shown in FIG. 1), the EOR of sets of three bit values that have been assigned the same number, and creates bit strings.

The hash circuit 83 is an EOR circuit that outputs the EOR of the three entered bit values. Since the context B, the virtual address B, and the index are the 9-bit bit strings, the hash circuit 83 outputs a 9-bit EOR bit string.

The TLB 27 shown in FIG. 3 uses as the TLB-RAM index address the bit string output by the hash calculating unit 26, and stores the address translation information, which is information pertaining to a between the virtual address and the physical address, in the storage location of a TLB-RAM 81 (which corresponds to the TLB-RAM 12 shown in FIGS. 1 and 3) indicated by the TLB-RAM index address.

To sum up, in the fourth embodiment, the hash calculating unit 26 creates a new bit string (the context B) from a plurality of bit strings (the bit string from the 0th bit to the 8th bit and from the 9th bit to the 12th bit of the context register 80) included in the context information, and calculates the hash value based on the created bit string (the context B) and the bit string of the virtual address (the index and the virtual address B). Because the bit strings of the context information are combined, the value of the TLB-RAM index address can be distributed efficiently.

The EOR circuit is used to calculate the hash value in the embodiments described. However, other known hash circuits may be used to calculate the hash value.

All the automatic processes explained in the present embodiment can be, entirely or in part, carried out manually. Similarly, all the manual processes explained in the present embodiment can be entirely or in part carried out automatically by a known method.

The sequence of processes, the sequence of controls, specific names, and data including various parameters can be changed as required unless otherwise specified.

The constituent elements of the apparatus illustrated are merely conceptual and may not necessarily physically resemble the structures shown in the drawings. For instance, the apparatus need not necessarily have the structure that is illustrated. The apparatus as a whole or in parts can be broken down or integrated either functionally or physically in accordance with the load or how the apparatus is to be used.

According to the present invention, thrashing can effectively be prevented. Moreover, the storage location of the address translation information can be distributed efficiently. Furthermore, the problems arising from determining the storage location based on the context information can be prevented. Moreover, the shared address translation information can be handled easily and accessed at high speed. Furthermore, all the bit strings of the original virtual address can be restored without problem.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An address translation information storing apparatus that stores address translation information having a pair of a virtual address and a physical address corresponding to the virtual address, the address translation information storing apparatus comprising:

an obtaining unit that obtains context information identifying an address space that the virtual address belongs to; and a determining unit that extracts a first bit string and a second bit string from a plurality of bit strings included in the context information, creates a reversed bit string, from the first bit string, calculates an exclusive OR between the second bit string and a third bit string extracted from the reversed bit string, creates new context information by combining a bit string obtained by the calculating of the exclusive OR and a fourth bit string included in the reversed bit string, the fourth bit string being a bit string other than the third bit string, and calculates a hash value from an exclusive OR between a bit string of the new context information and a bit string of the virtual address, and determines a storage location for storing the address translation information based on the hash value.

2. The address translation information storing apparatus according to claim 1, wherein the determining unit calculates the hash value from an exclusive OR between the bit string of the virtual address, a single or a plurality of bit strings included in the virtual address, and a bit string of the new context information.

3. The address translation information storing apparatus according to claim 1, further comprising a creating unit that creates a bit string of the virtual address based on information pertaining to the storage location determined and the context information.

4. An address translation information storing apparatus that stores address translation information having a pair of a virtual address and a physical address corresponding to the virtual address, the address translation information storing apparatus comprising:

an obtaining unit that obtains context information identifying an address space that the virtual address belongs to; and a determining unit that determines a storage location for storing the address translation information based on the context information, wherein the determining unit determines whether the address translation information is shared by a plurality of processes, does not execute a storing process of the address translation information in a random access memory based on the context information if the address translation information is shared, and stores the address translation information in a content addressable memory when the storing process of the address translation information based on the context information is not executed.

5. The address translation information storing apparatus according to claim 4, further comprising a creating unit that creates a bit string of the virtual address based on information pertaining to the storage location determined and the context information.

6. An address translation information storing method of storing address translation information having a pair of a virtual address and a physical address corresponding to the virtual address, the address translation information storing method comprising:

obtaining context information identifying an address space that the virtual address belongs to;

extracting a first bit string and a second bit string from a plurality of bit strings included in the context information;

creating a reversed bit string from the first bit string;

calculating an exclusive OR between the second bit string and a third bit string extracted from the reversed bit string;

creating new context information by combining a bit string obtained by the calculating of the exclusive OR and a fourth bit string included in the reversed bit string, the fourth bit string being a bit string other that the third bit string;

calculating a hash value from an exclusive OR between a bit string of the new context information and a bit string of the virtual address; and determining a storage location for storing the address translation information based on the hash value.

7. The address translation information storing method according to claim 6, wherein the calculating includes calculating the hash value from an exclusive OR between the bit string of the virtual address, a single or a plurality of bit strings included in the virtual address, and a bit string of the new context information; and determining a storage location for storing the address translation information based on the hash value.

8. The address translation information storing method according to claim 6, further comprising creating a bit string of the virtual address based on information pertaining to the storage location and the context information.

9. An address translation information storing method of storing address translation information having a pair of a virtual address and a physical address corresponding to the virtual address, the address translation information storing method comprising:

obtaining context information identifying an address space that the virtual address belongs to; and determining a storage location for storing the address translation information based on the context information, wherein the determining includes determining whether the address translation information is shared by a plurality of processes, not executing a storing process of the address translation information in a random access memory based on the context information if the address translation information is shared, and storing the address translation information in a content addressable memory when the storing process of the address translation information based on the context information is not executed.

10. The address translation information storing method according to claim 9, further comprising creating a bit sting of file virtual address based on information pertaining to the storage location and the context information.

* * * * *

UNITED STATES PATENT AND TRADEMARK OFFICE
CERTIFICATE OF CORRECTION

PATENT NO. : 7,587,574 B2  
APPLICATION NO. : 10/986136  
DATED : September 8, 2009  
INVENTOR(S) : Masanori Doi et al.

It is certified that error appears in the above-identified patent and that said Letters Patent is hereby corrected as shown below:

Column 12, Lines 56-57, change "sting of file" to --string of the--.

Signed and Sealed this

Twenty-second Day of December, 2009

David J. Kappos  
*Director of the United States Patent and Trademark Office*